United States Patent [19]

Schultz et al.

[11] Patent Number: 5,450,609

[45] Date of Patent: Sep. 12, 1995

[54] DRIVE ARRAY PERFORMANCE MONITOR

[75] Inventors: Stephen M. Schultz, Houston; Richard A. Ewert, Cypress, both of Tex.

[73] Assignee: Compaq Computer Corp., Houston, Tex.

[21] Appl. No.: 163,395

[22] Filed: Dec. 6, 1993

Related U.S. Application Data

[63] Continuation of Ser. No. 612,308, Nov. 13, 1990, abandoned.

[51] Int. Cl.6 .............................................. G06F 11/34
[52] U.S. Cl. .................... 395/800; 364/248.1; 364/264; 364/264.4; 364/265.5; 364/952; 364/952.2; 364/943.9; 364/944.7; 364/944.9
[58] Field of Search .......... 395/275, DIG. 1 MS File, 395/DIG. 2 MS File, 550, 575, 800; 371/15.1, 29.1, 21.1

[56] References Cited

U.S. PATENT DOCUMENTS

| | | | |
|---|---|---|---|
| 3,585,599 | 6/1971 | Hitt et al. | 395/275 |
| 3,704,363 | 11/1972 | Salmassey et al. | 395/275 |
| 3,787,670 | 1/1974 | Nelson et al. | 235/153 |
| 4,048,481 | 9/1977 | Bailey, Jr. et al. | 235/153 |
| 4,213,178 | 7/1980 | Diez et al. | 395/275 |
| 4,851,998 | 7/1989 | Hospodor | 364/300 |
| 4,885,683 | 12/1989 | Coogan | 395/275 |
| 5,090,014 | 2/1992 | Polich et al. | 364/513 |
| 5,121,263 | 6/1992 | Kerwin et al. | 395/275 |
| 5,157,666 | 10/1992 | Chen et al. | 371/21.1 |
| 5,287,363 | 2/1994 | Wolf et al. | 371/21.1 |

*Primary Examiner*—Robert B. Harrell
*Attorney, Agent, or Firm*—Pravel, Hewitt, Kimball & Krieger

[57] ABSTRACT

A system for monitoring performance of an intelligent array expansion system includes a controller for communicating with a host computer and associated intelligent array expansion systems, each of which has a plurality of fixed disk drives. The controller incorporates firmware to monitor a plurality of predetermined performance data, such data being thereafter stored in information storage devices. At the same time counts are maintained for selected parameters which are of interest to a systems manager. Such counts and the performance data are stored for each one of a plurality of preselected intervals, and an indication or warning is given to the systems manager when performance data, or when a selected parameter exceeds a preselected threshold.

16 Claims, 2 Drawing Sheets

DRIVE ARRAY PERFORMANCE MONITOR

This is a continuation of application Ser. No. 07/612,308 filed on Nov. 13, 1990, now abandoned.

CROSS REFERENCE TO RELATED APPLICATIONS

This application is related to the following commonly assigned applications: "Disk Array Controller With Parity Capabilities", Ser. No. 431,735, filed Nov. 3, 1989, now U.S. Pat. No. 5,206,943, "Bus Master Command Protocol", Ser. No. 431,737, filed Nov. 3, 1989, now U.S. Pat. No. 5,249,279, as well as "Disk Controller With Separate Data and Command Paths", Ser. No. 07/612,135, filed Nov. 13, 1990, now U.S. Pat. No. 5,241,630, each of which is incorporated herein by reference.

BACKGROUND OF THE INVENTION

1. Field of the Invention

This invention relates generally to intelligent drive arrays, and more particularly to systems for monitoring the performance of such intelligent drive arrays.

2. Statement of the Prior Art

Intelligent drive arrays are well known. For example, the COMPAQ SYSTEMPRO Personal Computer System which is manufactured by the assignee of the present invention offers the flexibility to be configured to meet a wide range of user needs, and is available in several standard model configurations each of which includes an intelligent drive array controller that is adaptable to two-drive, four-drive, six-drive and eight-drive arrays. Further information regarding a COMPAQ SYSTEMPRO Personal Computer System can be found in *Technical Reference Guide: COMPAQ SYSTEMPRO Personal Computer System*, Volumes I and II, Compaq Computer Corporation (1989), which are incorporated herein by reference.

One perceived problem with the above-noted COMPAQ SYSTEMPRO Personal Computer System, in spite of its overwhelming capabilities to process information, is its relative lack of information storage space. It has been suggested, therefore, that an intelligent array expansion system be provided to fully utilize the capabilities of file servers such as the COMPAQ SYSTEMPRO Personal Computer System.

Managers of such file servers must constantly supervise the system to ensure that it meets the needs of its users. One certain aspect which needs to be monitored is the performance of the system information storage means (e.g., the intelligent drive arrays which are used in the COMPAQ SYSTEMPRO Personal Computer System, or other such intelligent array expansion systems which may be used). The primary purpose of monitoring the storage means is to record and provide information which may be used to identify a performance degradation or, more cautiously, to predict a catastrophic hardware problem.

SUMMARY OF THE INVENTION

A system for monitoring performance of an intelligent array expansion system comprising controller means for communicating with a host computer and associated intelligent array expansion systems, each of which has a plurality of fixed disk drives. The controller means incorporates firmware which is compatible with the register set and command passing protocol that is disclosed in the above-referenced "Bus Master Command Protocol", Ser. No 431,737, filed Nov. 3, 1989, now U.S. Pat. No. 5,249,279.

A plurality of predetermined performance data is monitored periodically by such firmware, and is thereafter stored in various information storage means. At the same time counts are maintained for selected parameters which are of interest to a systems manager. Such counts and the performance data are stored for a plurality of preselected intervals, and an indication or warning is given to the systems manager when performance data, or when a selected parameter exceeds a preselected threshold. This is usually accomplished by way of the host computer. Alternatively, however, a determination of exceeding the thresholds may be made by the controller means by way of the firmware itself with the parameter thresholds set by the host computer.

These and other objects according to the present invention will become more apparent from the following detailed description of a preferred embodiment thereof, when considered in conjunction with the accompanying drawings wherein:

DETAILED DESCRIPTION OF THE PREFERRED EMBODIMENT

Figure 1:
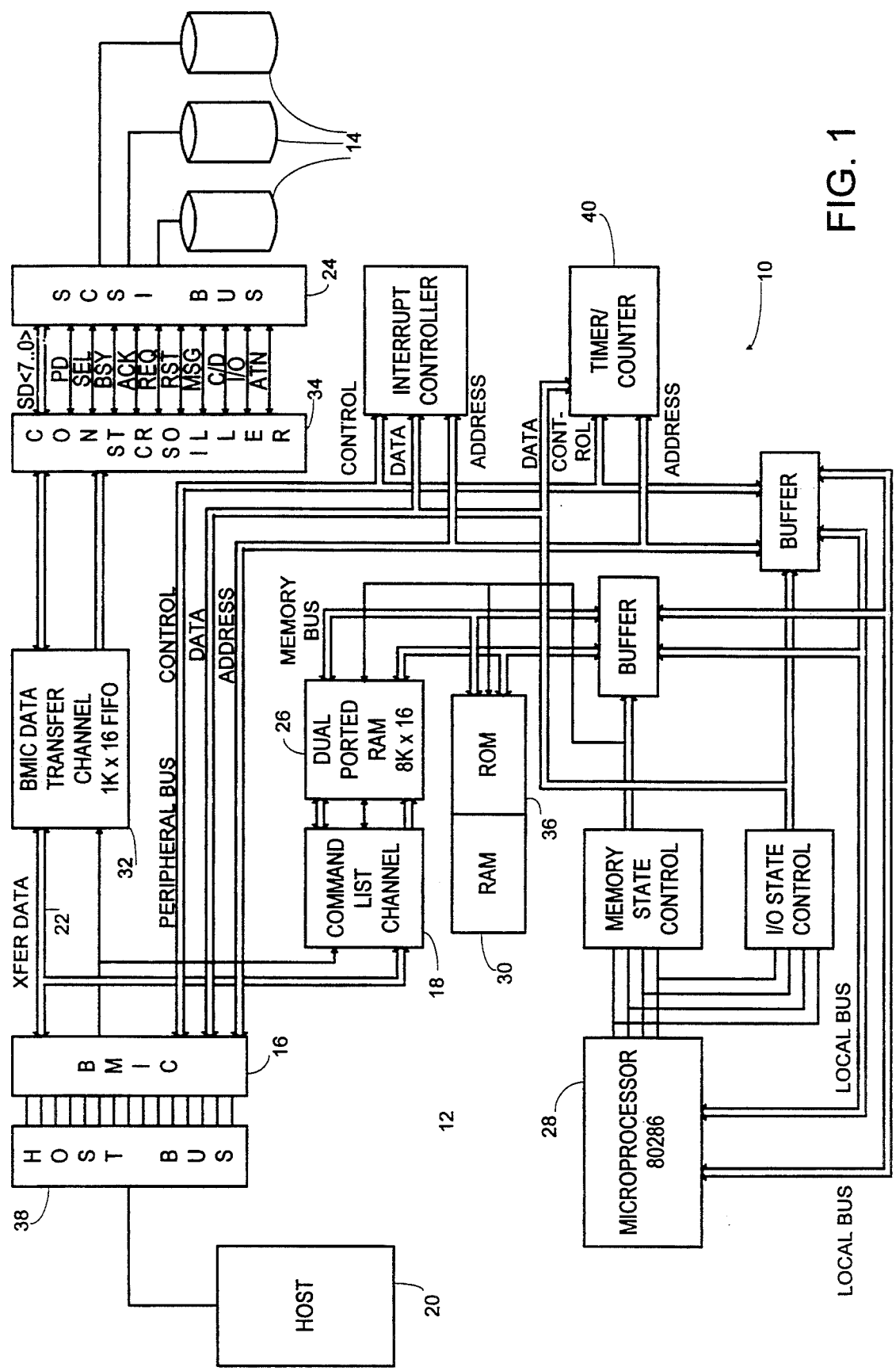
FIG. 1 is a functional block diagram of the drive array performance monitor according to the present invention, showing in detail controller means for an intelligent array expansion system.

Referring now to the drawings, wherein like numbers designate like or corresponding parts throughout each of the several views, there is shown in FIG. 1 a functional block diagram of a drive array performance monitor 10 according to the present invention.

As noted previously herein above, the drive array performance monitor 10 includes controller means 12 which is compatible with the register set and command passing protocol disclosed in the above-referenced "Bus Master Command Protocol", Ser. No. 431,737, filed Nov. 3, 1989, now U.S. Pat. No. 5,249,279. It does not, however, support all of the configuration options or fault tolerant features of the intelligent drive array which incorporates such protocol. Instead, it provides high-performance access to a large amount of disk storage while using only one EISA slot. The controller means 12 is capable of efficiently managing access of up to seven small computer system interface (SCSI) drives 14 on a single. SCSI bus, and will allow those disks in the drives 14 to be presented to the system as a unique volume or as a number of drives 14. Further information regarding the controller means 12 may be found in copending "Disk Controller With Separate Data and Command Paths", Ser. No. 07/612,135, filed Nov. 13, 1990.

Controller means 12 includes a bus master interface which allows access to the drives 14 and provides several compatibility and performance features. When writing new disk device drivers, port selection depends on the softwares particular needs for speed and compatibility. The bus master interface provides a 32-bit data path and up to 33 Megabytes per second (Mb/s) transfer rate between the system memory and the controller means 12. This high-speed port includes the control and status registers necessary to respond to commands and requests when processing data transfers. Because it can handle multiple requests, the bus master interface 14 can receive and service requests in the order that offers the highest overall throughput. To take advantage of such performance features, therefore, the operating system disk device driver must be specifically written for use with the bus master interface.

A bus master interface controller (BMIC) 16 has two channels that are multiplexed in its internal data transfer controller. The two channels can be programmed for unrelated transfers, and one of these channels 18 is dedicated for command list transfers from the host 20 into the adaptor, while the other channel 22 is dedicated to data transfers to and from the drives 14 via a SCSI bus 24.

A dual-ported RAM (8K×16) 26 resides between the BMIC 16 and microprocessor 28. The BMIC 16, thereby, becomes a bus master and brings the command lists into the dual-ported RAM 26 using the channel 18 that is assigned to command list transfers. The dual-ported command list RAM 26 occupies address space of microprocessor 28, so that it has immediate access to the command list. Commands are first converted to SCSI command descriptor blocks (CDB's) and then queued in a local processor RAM 30.

A FIFO (1K×16) 32 links the SCSI controller 34 (e.g., an NCR 53C95 manufactured by NCR Corporation) and the BMIC 16 together for passing data. FIFO 32 guarantees that the BMIC 16 will be able to transfer enough data each time that it gets on the EISA bus, for efficient host bus utilization. Furthermore, FIFO 32 is managed by discrete logic and tristate buffers so that a single direction part can be utilized as a bidirectional link. The second channel in BMIC 16 is associated with this data FIFO 32 so that both data transfers in either direction and a command list transfer can be programmed in the BMIC 16 at the same time. The controller means 12 also contains some registers which are implemented in discrete logic for EISA configuration and board configuration.

As is readily apparent from FIG. 1, the controller means 12 preferably employs an 80286 microprocessor 28, which is coupled with various support chips and discrete logic to manage bus cycles, interrupts, and timer functions. Microprocessor 28 also comprises a local RAM 30 for its processing needs and a ROM 36 containing the firmware for the controller means 12, as well as that for the drive array performance monitor 10 according to the present invention. The interface to the SCSI bus 24 is through the SCSI controller 34 which has a microprocessor port for programming the part and a DMA port for passing data to and from the SCSI bus 24. Both ports can be accessed simultaneously so that microprocessor 28 can program the part for the next bus phase while data is being transferred through the DMA port.

Figure 2:
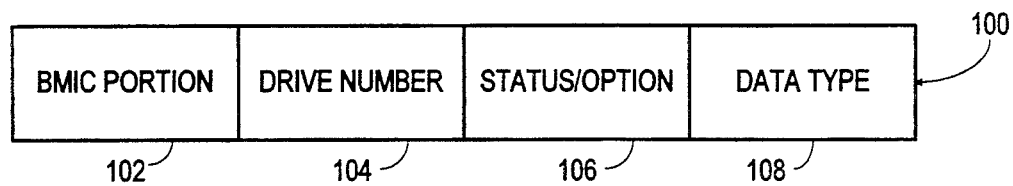
FIG. 2 is a simplified diagram of the COMMAND used in controlling the drive array performance monitor shown in FIG. 1.

Referring now to FIG. 2, there is shown therein a block diagram of a COMMAND which is used in controlling the drive array performance monitor 10 shown in FIG. 1. As shown in FIG. 2, COMMAND 100 comprises a BMIC portion 102 which is common to BMIC commands following a protocol described in copending application "Bus Master-Command Protocol", Ser. No. 431,737, filed Nov. 3, 1989, now U.S. Pat. No. 5,249,279. Three additional portions are append to BMIC portion 102 in order to carry out systems and methods according to the present invention. A first portion 104 is set to identify the particular drive 14 which is to be monitored, while second portion 106 is set to identify selected status/option flags and third portion 108 is set to identify a particular data type.

The COMMAND 100 is passed to controller means 12 from the host 20 via the host bus 38 shown in FIG. 1. Thereafter, the controller means 12 reads in the COMMAND 100, parses it out into discrete steps, and performs those discrete steps as specified by the firmware embedded in RAM 30 and ROM 36 (FIG. 1). Particular data required by the COMMAND 100 is obtained by performing one or more selected performance tests on the drives 14; for example, the performance tests can be variations on seek time performance tests.

In accordance with a particularly preferred embodiment of this invention, three separate seek tests are performed on drives 14 when the COMMAND 100 is received by controller means 12. First, a "SEEK_TIME_TRACK" test is performed as follows: (1) beginning at track 0, a drive 14 is instructed to seek to its next block; (2) the time to perform this step is saved in memory; (3) steps (1) and (2) are repeated a preselected number of times (e.g., ten times); and (4) an average is determined from the results of those number of seek times "track".

Second, a "SEEK_TIME_THIRD" test is performed as follows: (1) after having determined what constitutes a "third stroke" of the disks in drive 14, the drive 14 is instructed to seek a third; (2) the time to perform step (1) is saved in memory; (3) the drive 16 is again instructed to seek a third; (4) the time to perform step (3) is also saved in memory; (5) the drive 14 is instructed to seek back to where it started step (1); (6) the time to perform step (5) is saved in memory; (7) an average of the times measured in steps (2), (4) and (6) is determined; (8) the cycle defined by steps (1) through (7) are repeated a preselected number of times (e.g., ten times); and (9) an average of the averages determined by each of the steps (7) is determined from the results of those number of seek times "third".

Third, a "SEEK_TIME_FULL" test is performed as follows: (1) the drive 14 is instructed to seek a "full stroke", from inside to outside and back; (2) and average of each of the full stroke seeks is determined; (3) steps (1) and (2) are repeated a predetermined number of times (e.g., ten times); and (4) an average of the averages determined by each of the steps (2) is determined from the results of those number of seek times "full".

Subsequent to the performance of the above-described tests, their results are stored as four separate data sets in the manner outlined below. First and second sets of the data are maintained in the reserved space on each of those drives 14 in a given array. The third and fourth sets of data are maintained in RAM 30 (FIG. 1) for reasons that will become more apparent from the description below.

As noted previously herein above, second portion 106 is set to identify selected status/option flags for the COMMAND 100. Such status/option flags are used by the host 20 to instruct controller means 12 exactly what is to be done. For example, in the presently preferred embodiment of this invention, a status/option flag value of "1" signifies an instruction to "SAMPLE" (i.e., run performance tests as outlined above). On the other hand, a status/option flag value of "2" signifies an instruction to "RETURN DATA" to the host 20 on completion of a "SAMPLE"; status/option flag value of "3" signifies an instruction to "RESET" the second set of data to zero; status/option flag value of "4" signifies an instruction to "SAVE" after having sampled the data; and status/option flag value of "8" signifies a factory initialization bit which instructs controller means 12 to run the performance tests noted above after manufacture and save those values in the first data set.

Third portion 108 is set to identify particular data types. That is, one data type according to the preferred embodiment of the invention is performance and statistical data since the drive 14 was manufactured. Such data is saved to the reserved space on each of the drives 14, and is updated periodically. Another data type comprises the performance and statistical data since the drive 14 was last "RESET" by the system manager. This "SINCE_LAST_RESET" data set is also saved to the reserved space on each of the drives 14, and is updated periodically. Furthermore, the values of such data will be initialized to zero when "RESET" status/option flag is set. Two other data sets, the third and fourth data sets, are maintained in local RAM 30 as noted above. The third data set is used to keep a running count of the statistical data taken since the drive array was powered on, while the fourth set of data keeps another running count of such statistical data.

Periodically, the drive array performance monitor 10 cause the host 20 to issue a COMMAND 100 to run performance tests, and save such data to the particular data sets. Timer/counter 40 (FIG. 1) may be set to go off, for example, every hour. When a given time period expires and the timer/counter 40 goes off, host 20 issues the COMMAND 100 for drive array performance monitor 10 to conduct performance tests and save the current counts of the statistical data kept to date by the timer/counter 40. After those tests are performed in the manner outlined above, the current count maintained by the fourth data set in RKM 30 is added to the amounts saved in the third data set in RAM 30. The fourth data set is set back to zero, and the third data set represents an updated version of the statistical data maintained since last power on.

At the same time, results of each of the performance tests made are saved to the first and second data sets. The results are compared with the initial data maintained in the first data set or the since last reset data maintained in the second data set, and a comparison may be made to determine if changes in those results exceed a preselected threshold. If so, a warning is sent to the host 20 to alert the system manager, or alternatively, the firmware itself may be used to provide an indication (e.g., a flashing LED) on the intelligent array expansion system.

The statistical data which is counted by the timer/counter 40 in accordance with the preferred embodiment of this invention is selected from the group consisting of a number of sectors read, a number of hard read errors, a number of retry read errors, a number of ECC read errors, a number of sectors written, a number of hard write errors, a number of retry write errors, a number of seeks, a number of seek errors, a number of spin cycles, a number of reallocation sectors, and a number of reallocated sectors. All or some of this data may be counted depending upon the particular needs of the system manager.

Figure 3:
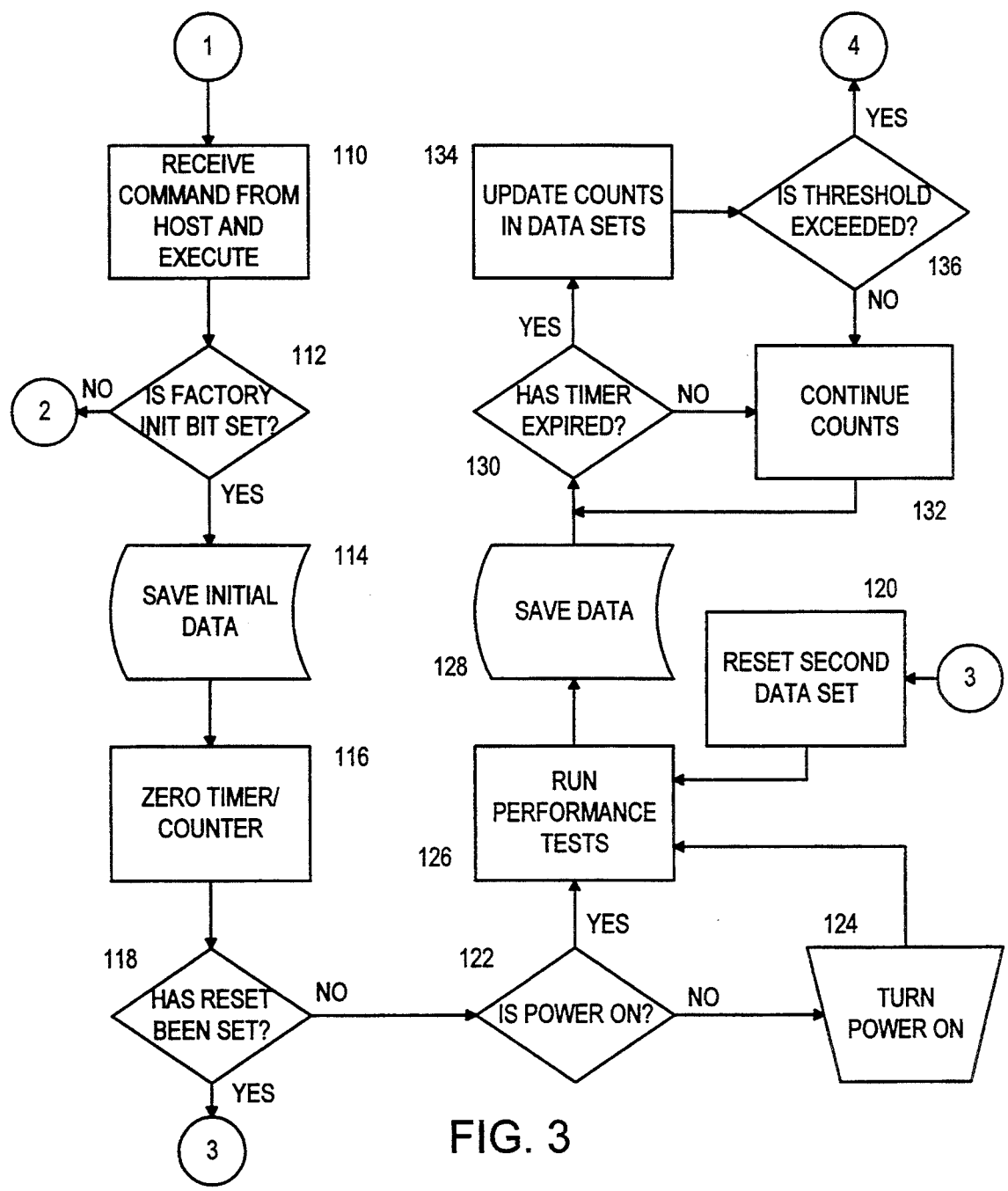
FIG. 3 is a flow diagram illustrating a system and method to implement the drive array performance monitor in accordance with the present invention.

Referring now to FIG. 3, a flow diagram illustrates the system and method for implementing drive array performance monitor 10 in accordance with the present invention. Beginning with the indicator #1, the COMMAND 100 is received from the host 20 by the controller means 12 and executed thereby through firmware at step 110. An analysis is then made at step 112 as to whether factory initialize bit has been set. If not, then such bit should be set at the status/option flag portion 106 of the COMMAND 100. At the time of initial manufacture, however, this flag should be set and initial performance tests run to determine baseline values. Then the baseline performance values are saved at step 114.

Timer/counter 40 (FIG. 1) is then zeroed at step 116 to ensure accurate maintenance of statistical data and time during a particular period under evaluation (e.g., since last reset, since power on, etc.). An analysis is made by the firmware at step 118 whether or not the reset status/option flag has been set, and, if so the second data set of statistics is zeroed at step 120. Were the reset status/option flag not set, further determinations will be made at step 122 to see whether power is on to the drive array.

If the power is not on, a manual operation must be made at step 124 to turn on power. Thereafter, the performance tests that are described above will be performed at step 126, as in the cases where power is turned on as determined by step 122. Data from the performance tests are then saved in a manner previously described, at step 128. At step 130, a determination is made as to whether timer/counter 40 (FIG. 1) has expired (e.g., the one hour period since the last performance tests has run out). If not, counts for the selected statistics will continue as shown at step 132. If so, another set of performance tests will be made and the statistical counts will be updated in the stored data sets as described above, at step 134. Periodically (in essence continuously), the firmware will assess whether one or more of a plurality of preselected data thresholds have been exceeded, as shown at step 136. If not, the counts will continue in the manner shown at step 132.

On the other hand, if the thresholds have been exceeded, a warning may be issued at indicator #4. Such warning alternatively will be a displayed notice to the host 20 through the host bus 38, or it may be a visible indicator on the drive array, as driven by the firmware described herein. For example, if one threshold has been exceeded that merely represents a degraded drive, a flashing amber indicator upon the drive array can be used to indicate such degradation. On the other hand, if device-threatening thresholds are exceeded, the firmware can drive the amber indicator steadily lit.

Obviously, many modifications and variations of the above described invention are possible in light of these teachings. It should be readily apparent, therefore, that within a scope of the appended claims, the invention may be practiced otherwise than as is specifically described herein.

What we claim is:

1. A system for monitoring performance of an intelligent array expansion unit having a plurality of disk drives, comprising:
   a host computer;
   controller means, coupled to said host computer, to control transfer of data to and from the plurality of disk drives;

means, associated with said controller means, for measuring operation time of one or more preselected physical movements;

means, associated with said controller means, for periodically activating said measuring means; and means, associated with said controller means, for storing said measured operation times to a log for each activation of said measuring means and for retrieving said operation times from said log.

2. The system of claim 1, further comprising:

means, associated with said controller means, for counting one or more preselected statistical parameters; and means, associated with said controller means, for storing and retrieving said statistical parameters.

3. The system according to claim 2, further comprising means for tracking an amount of time elapsed since a predetermined event.

4. The system according to claim 3, wherein said predetermined event is selected from the group consisting of a time since manufacture of the disk drive, a time since the intelligent array expansion unit was last reset, and a time since the intelligent array was last powered on.

5. The system according to claim 2, wherein said counting means counts a plurality of statistics selected from the group consisting of a number of sectors read, a number of hard read errors, a number of retry read errors, a number of ECC read errors, a number of sectors written, a number of hard write errors, a number of retry write errors, a number of seeks, a number of seek errors, a number of spin cycles, a number of reallocation sectors, and a number of reallocated sectors.

6. The system according to claim 1, wherein said measuring means measures a seek time track.

7. The system according to claim 1, wherein said measuring means measures a seek time third.

8. The system according to claim 1, wherein said measuring means measures a seek time full.

9. The system according to claim 1, wherein said measuring means measures a parameter related to seek time for a predetermined number of times, and thereafter determines an average of said seek time related parameter.

10. The system according to claim 1, further comprising means for determining which one of the plurality of disk drives is being measured or counted, said determining means including means for storing said determination to said log.

11. A method of monitoring an intelligent array expansion system having a plurality of disk drives and coupled to a host computer, comprising the steps of:

providing controller means, coupled to said host computer, to control transfer of data to and from the plurality of disk drives;

associating means within said controller means for measuring operation time of one or more preselected physical movements;

associating means within said controller means for measuring each one of said physical movement operation times at periodic intervals; and storing said measuring operation times to a log.

12. The method according to claim 11, further comprising the steps of:

associating means within said controller means for counting one or more preselected statistical parameters; and storing said counted statistical parameters at periodic intervals.

13. The method according to claim 12, further comprising the steps of:

retrieving said stored statistical parameters; and updating said retrieved statistical parameters with current data.

14. The method according to claim 12, further comprising the step of providing a warning to the host computer when one or more of said statistical parameters exceeds a preselected threshold.

15. The method according to claim 11, further comprising the steps of:

retrieving said stored operation times from said log.

16. The method according to claim 11, further comprising the step of providing a warning to the host computer when one or more of said operation times exceeds a preselected threshold.

* * * * *